United States Patent Office 3,272,008
Patented Sept. 13, 1966

3,272,008
APPARATUS FOR TESTING PRESSURE IN PNEUMATIC TYRES
Pierre Lamperti, 20 Ave. Duval-Le Camus, Saint-Cloud (Seine et Oise), France
Filed Feb. 12, 1964, Ser. No. 344,305
7 Claims. (Cl. 73—146.3)

This invention relates to apparatus for measuring gas pressures, particularly the air pressures in pneumatic tyres.

In apparatus according to the invention the gas pressure is indicated by the height of a column of liquid displaced into a tube from a closed chamber into which an open end of the tube projects by the admission of the gas to the chamber. The level or location of the liquid in the chamber can be changed whereby the open end of the tube, which is normally below the liquid surface when the apparatus is in use, is clear of the liquid when the apparatus is not in use.

Preferably the level or location of the liquid in the chamber is changed by pivoting the apparatus whereby the tube is changed from a vertical or near vertical operative position to a horizontal or near horizontal non-operative position.

The apparatus of the invention can be arranged on a fixed support on which the apparatus is pivotally mounted and may compare means for maintaining or locking the apparatus either in the inoperative position or in the operating position. Furthermore, the members for connecting the gas pressure source to the apparatus may be provided with valves for the admission and balancing of the compressed air obtained from the source in the fluid tight chamber, or for the establishment of communication between the fluid-tight chamber and the atmosphere.

The terminal portion of a tube for admitting gas under pressure into the fluid-tight chamber is preferably engaged in a cylindrical seating or cavity formed in the wall of the chamber opposite its point of entry into the chamber, the diameter of cavity being very slightly greater than that of the inlet tube so as to form a small annular space in which the gas is damped before penetrating into the container itself.

So that the invention will be better understood an example in accordance with it will now be described with reference to the accompanying drawings which show an apparatus for measuring the pressure in pneumatic tyres and in which:

FIGURE 3 is a section along the line III—III of FIGURE 1.

Figure 1:
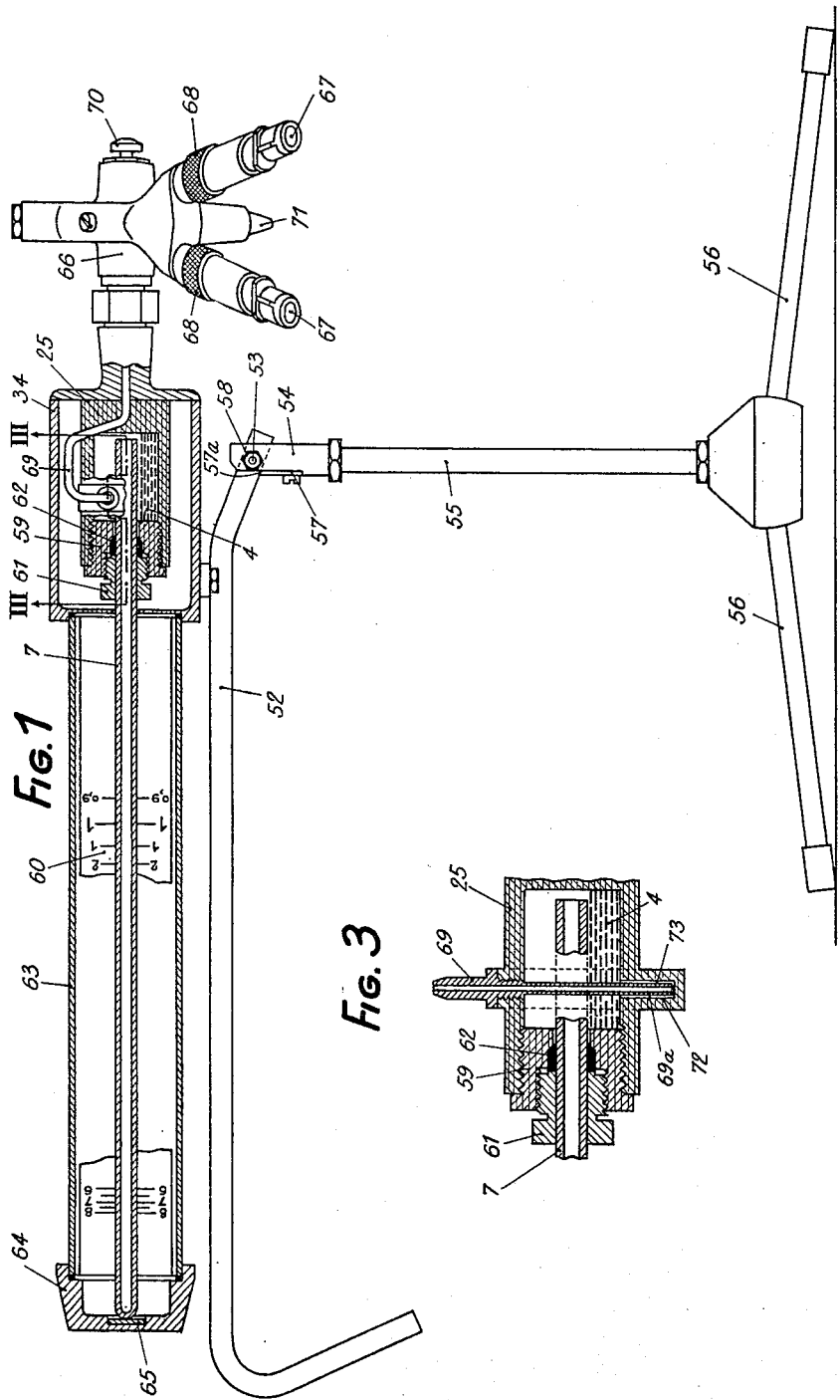
FIGURE 1 is an elevational view of the testing apparatus in accordance with the invention in the inoperative position.

The apparatus illustrated comprises a housing or casing 34 connected to a support element 52 pivotally mounted by means of a pivot 53 on a sleeve 54. Sleeve 54 is fast with a fixed support 55 mounted on the legs 56 providing for perfect stance of the arrangement on the ground.

Figure 2:
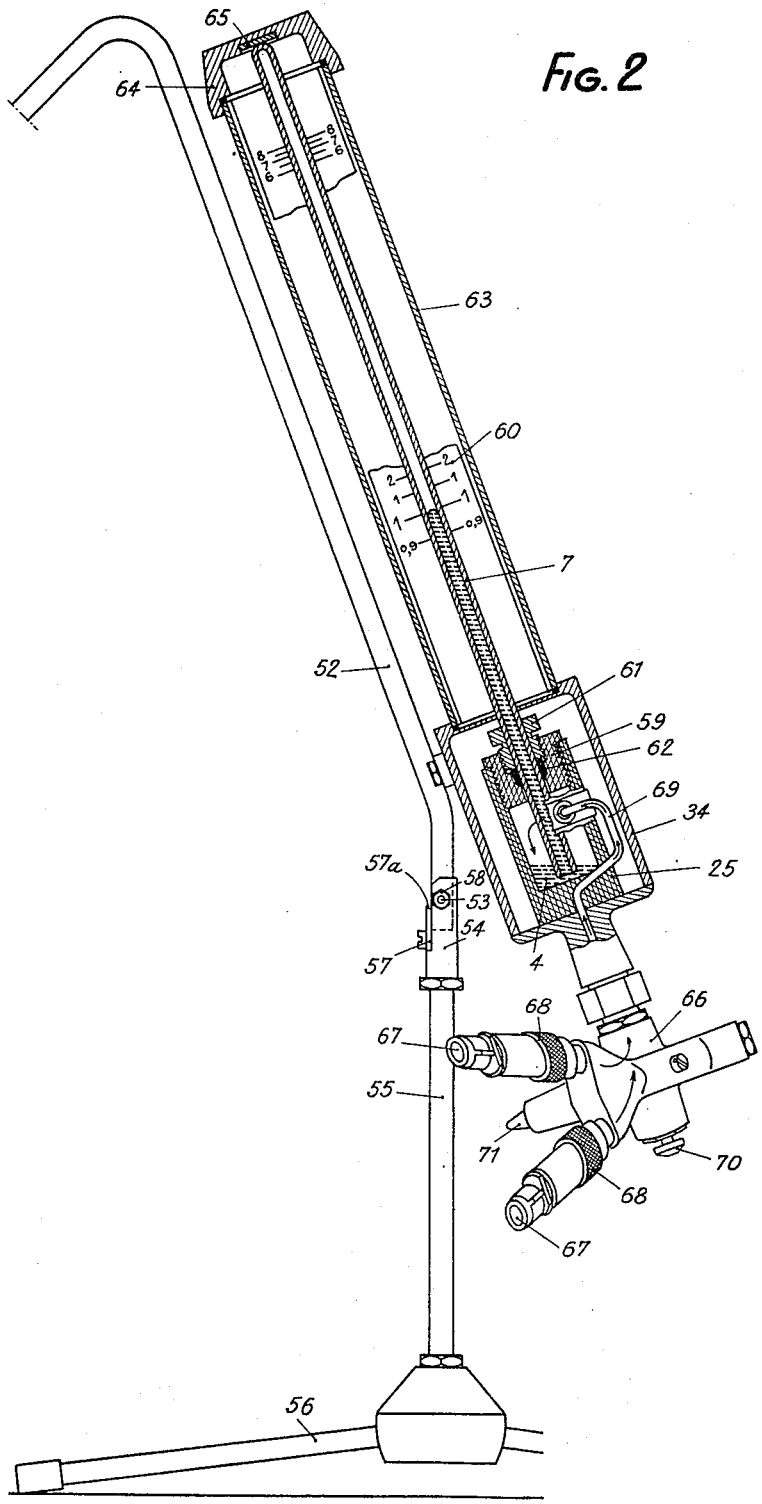
FIGURE 2 shows the same apparatus in the pressure-testing position.

The sleeve 54 carries a stop 57 provided with a nose 57a on which the support member 52 bears when the apparatus is in the inoperative position (FIGURE 1). The support element 52 bears when the apparatus is in the pressure-testing position, against the stop 57 (FIGURE 2). Mounted on the pivot 53 is a lock nut 58 by means of which it is possible to adjust the locking of the apparatus in the inoperative position or in the testing position.

Disposed within the housing 34 is a fluid-tight container 25, closed by a screwthreaded plug 59 and forming a reservoir for mercury 4. Into the container 25 extends a reading tube 7 an open end of which is disposed in the vicinity of the end face of the fluid-tight container 25. The tube 7 carries a scale 60 for pressure reading. The reading tube 7 is maintained in the screwthreaded plug 59 with the aid of a nut 61 provided with a sealing packing 62. The reading tube and its scale 60 are disposed in a cylindrical protective sheath 63 made of a transparent material and carried on the housing 34.

The cylindrical protective sheath 63 is provided, at its end opposite the housing 34 with a cap 64 provided with a washer 65 of pliable material on which bears the closed end of the reading tube 7.

The housing 34 is fast with a bypass arrangement 66 provided with two connecting conduits 67 having balancing valves 68 by means of which, when the connecting conduits 67 are connected to pneumatic tyres, the pressure of which it is desired to test, the compressed air obtained from the tyres is admitted to the fluid-tight mercury container 25. There are two conduits 67 intended to connect the apparatus simultaneously either to the two pneumatic tyres of the front wheels of the vehicle or to the two pneumatic tyres of the rear wheels of said vehicle. If, after having connected the two conduits 67 to the pneumatic tyres of the front wheels for instance, one of the valves 68 is opened while the second valve is closed, the pressure of the pneumatic tyre of which the conduit is open can be tested. When closing the first conduit and opening the second one the pressure of the second tyre is tested. When the two valves connected to the tyres are opened, a uniform pressure is obtained in the tyres by a mere inner communication in the by-pass arrangement 66, without it being necessary to connect the system to the container 25.

When the two valves 68 are opened and the system is communicating with the container 25, the balance pressure of the two tyres can be tested.

The by-pass arrangement 66 comprises a conduit which is not represented on the drawings to connect to a compressor, a control knob 70 and a manipulating handle 71 the purpose of which will be explained later.

When the apparatus has been put in the testing position illustrated in FIGURE 2, the conduits 67 are connected to the pneumatic tyres, the pressure of which it is desired to test. After opening the balancing valves 68, the compressed air obtained from the tyres flows (as indicated by the arrows in FIGURE 2) through the tube 69 towards the fluid-tight container 25 thus admitting the pressure to the interior of the latter and compelling a portion of the mercury 4 to rise in the tube 7. The height of the mercury contained in the tube 7 indicates on the scale 60 the pressure obtaining in the tyres.

When, after having tested the pressure in one or the other of the tyres, it is desired to diminish the pressure by deflating the tyre, it suffices to press the control knob 70. When, on the other hand it is desired, after testing the pressure, to increase the pressure by inflation, pressure is exerted on the control handle 71, so that the by-pass arrangement 66 opens or closes the circuits as may be desired.

At the instant at which the apparatus is returned to the inoperative position, the conduits 67 having been disconnected and one or the other of the valves 68 opened, the mercury 4 re-descends in the fluid-tight container 25 and the pressure escapes through the conduit 69.

When the apparatus is maintained in the inoperative position (see FIGURE 1), the mercury returns to its position along the wall of the container 25, freeing the open end of the tube 7 which communicates with the atmosphere via the conduit 69 and the one or the other of the valves 68 which has remained open.

In order to prevent the compressed air obtained from the pneumatic tyres to be tested and admitted through the tube 69 into the fluid-tight reservoir 25 from producing, under the momentary effect of an excessively sudden pressure, the irregular rising of the mercury in the mercury tube, the terminal portion 69a of the tube 69 is engaged in a cylindrical seating (see FIGURE 3) formed in the body of the fluid-tight container 25 in such a manner as to provide in the said seating 72 a small annular space 73 in which the compressed air velocity is damped before penetrating into the container 25 itself, so as to cause the mercury 4 to rise in the reading tube 7.

What I claim is:

1. Gas pressure measuring apparatus comprising a frame, a housing pivotally mounted on said frame and operative to be disposed in a substantially horizontal position corresponding to a non-operative condition of said apparatus and to an upright position corresponding to an operative condition of said apparatus, a gas tight chamber partially filled with a liquid disposed in said housing, an inlet tube connected at one end to said chamber and being selectively connectable at the other end to the atmosphere and to a source of gas under pressure, a measuring tube closed at one end and open at the other end disposed in said housing, said measuring tube extending at its open end into said chamber, conduit means operative to selectively interconnect said inlet tube to a source of gas under pressure, said chamber having an amount of liquid therein such that when said housing is in a substantially horizontal non-operative position the level of said liquid is below said reading tube open end and when said housing is in said operative position said reading tube open end is immersed in said liquid thereby causing said liquid to rise in said reading tube to a height corresponding to the gas pressure in said chamber.

2. Appratus as defined in claim 1 including locking means for selectively locking said housing in said operative and said non-operative positions respectively.

3. Apparatus as defined in claim 2 wherein said conduit means includes valve means for controlling the admission of pressurized gas into said inlet tube.

4. Apparatus as defined in claim 3 wherein said valve means comprises first and second valves operative to selectively connect said inlet tube to first and second sources of pressurized gas.

5. Apparatus as defined in claim 1 wherein said chamber comprises an end face and a surrounding wall having a cavity therein of a predetermined cross-sectional dimension, said apparatus including means for damping the gas flow from said inlet tube into said chamber, said damping means comprising a pipe connected at one end to said inlet tube and at the other end disposed in said cavity, said pipe having a bore size less than said cavity cross-section such that the space between said pipe and the cavity wall is less than the cross-sectional area of the bore of said pipe.

6. Apparatus as defined in claim 1 wherein said housing includes a transparent protective sheath encasing said measuring tube.

7. Apparatus as defined in claim 6 wherein said housing further includes a cap at one end of said sheath receiving the closed end of said measuring tube thereby aligning said measuring tube substantially coaxially with said protective sheath.

References Cited by the Examiner

UNITED STATES PATENTS

| 948,526 | 2/1910 | Sandham | 137—227 |
|---|---|---|---|
| 1,513,740 | 11/1924 | Brown | 137—227 X |
| 2,837,129 | 6/1958 | Veny | 137—228 |

LOUIS R. PRINCE, *Primary Examiner.*

D. O. WOODIEL, *Assistant Examiner.*